United States Patent

[11] 3,610,461

| [72] | Inventor | George Allyn<br>599 E. 7th St., Brooklyn, N.Y. 11218 |
|---|---|---|
| [21] | Appl. No. | 19,793 |
| [22] | Filed | Mar. 16, 1970 |
| [45] | Patented | Oct. 5, 1971 |

[54] CONVERTIBLE FOOD CONTAINER
21 Claims, 13 Drawing Figs.

[52] U.S. Cl. .................................................. 220/54,
220/94 R, 16/110 R, 99/171 H, 40/306
[51] Int. Cl. ....................................................... B65d17/24,
B65d 25/28
[50] Field of Search............................................ 220/94, 95,
54; 40/306; 99/171 H; 16/110 R, 114

[56] References Cited
UNITED STATES PATENTS
3,082,906 3/1963 Reed ............................ 220/95
3,456,283 7/1969 Glenn........................... 220/94

*Primary Examiner*—George T. Hall
*Attorney*—Kirschstein, Kirschstein, Ottinger & Frank ABSTRACT: The essence of the invention resides in a food container package which is usable as a cooking utensil before or after the container has been opened. A can composed of any well-known metallic composition capable of being used in the packaging of food stuffs is provided with a handle integrally connected to the rim on the upper edge of the can and is extensible therefrom to be held by the user thereof as a normal pot handle. The cover of the can is removable from the food container and is adapted to be used as a pot lid. The food container is provided with an upwardly extending ridge therearound and may be further provided with a plurality of inwardly extending protrusions so that the lid when removed from the can is provided with a means for maintaining the position of the lid when the same is being used as a cover.

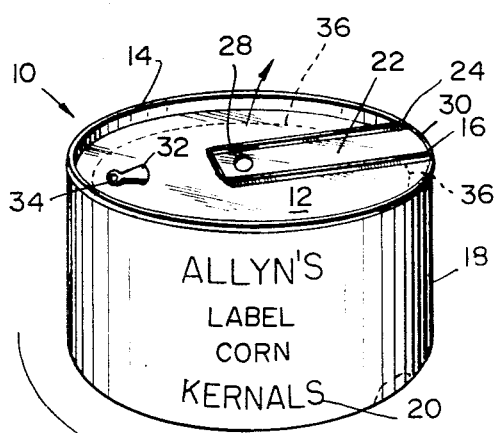
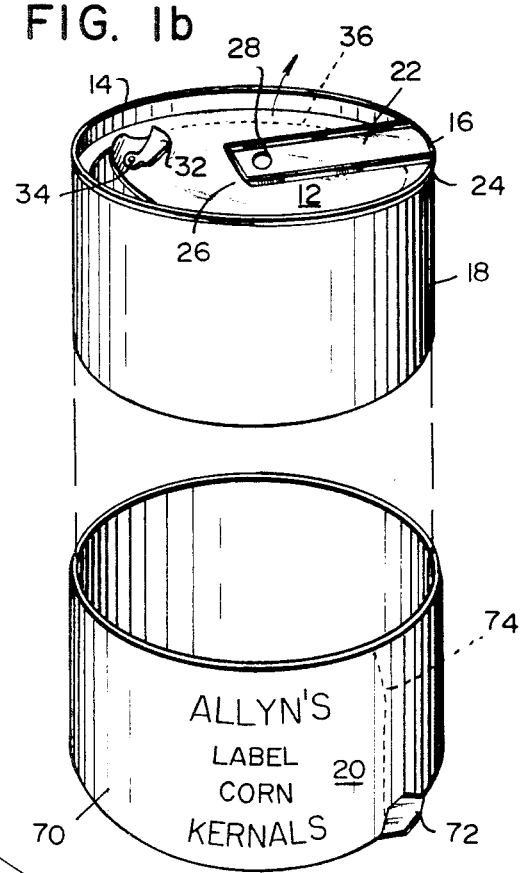
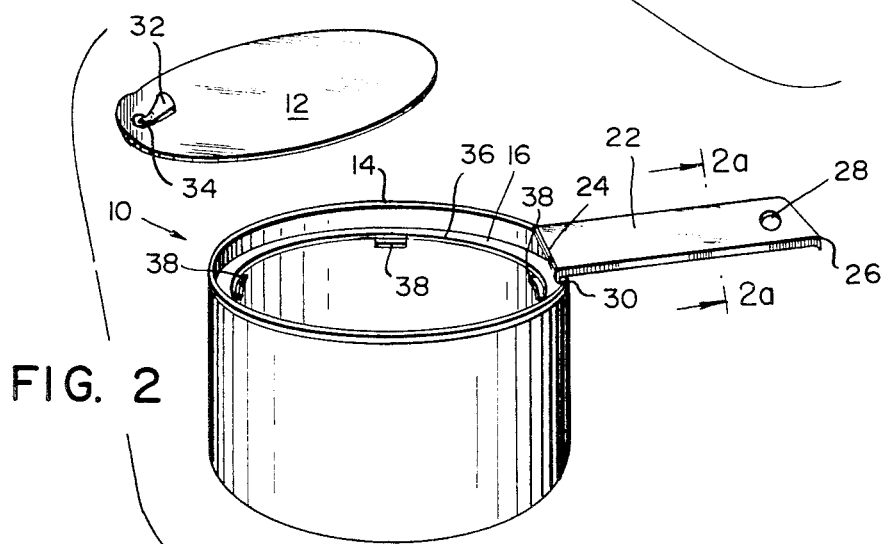

INVENTOR
GEORGE ALLYN

INVENTOR
GEORGE ALLYN
BY
Kirschstein, Kirschstein, Ottinger & Frank

ATTORNEYS

CONVERTIBLE FOOD CONTAINER

BACKGROUND OF THE INVENTION

The present invention relates to a food container and more particularly to a food container which is convertible into a cooking utensil.

Heretofore, it has been known in the prior art that various types of food containers are adapted to be further used as cooking utensils after the food container has been opened. The majority of the prior art devices required the removal of a handle which was temporarily affixed to a portion of the food container and after removal was connectable to the outer surface of the food container by a latching means. Other handles were permanently affixed to the can but were generally too short for safe gripping and were impractical. This handle was used to hold the food container much the same as a handle on an ordinary cooking pot. Limited attempts have been made to provide a removable handle which would remain integral with the food container after the same had been opened so that the extensible handle may be utilized when the food container was used as a cooking pot. Other devices provided flat metals which had to be bent into the shape of a handle after the removal of extension from the can or food package. In these cases, when the flat metal was folded on the exterior of the can, these devices were considered unsafe because of the edges protruding from the can's side.

Various difficulties with the prior art devices indicated that these numerous attempts were rather impractical for a varying degree of reasons. For example, once the food container was opened there was no means of resealing the same after the contents thereof was cooked.

Further problems resulted in the means of connection of the handle which was to be removed from the body of the container. It was found that it was difficult to maintain the handle on the container and thereafter to support the same after the handle was removed.

Yet another difficulty with the prior art devices was found in that the use of the food container with its label attached to the outer surface as a cooking utensil resulted in the burning of the label during the actual cooking process. No means was provided for the removal of the label except as by tearing the label from the container or soaking the can to remove the paper label before utilizing the can as a cooking utensil.

Further, the handles which were formerly provided in prior art devices were unable to provide a cooler surface to be gripped even when a handle was extended from the can. The structure of these handles were such that they easily retained the heat of the cooking utensil, which was undesirable.

SUMMARY OF THE INVENTION

It is an object of the present invention to avoid and overcome the foregoing and other difficulties in the prior art by providing a food container which is convertible into a cooking utensil.

Another object of the present invention is to provide a food container with an extensible handle which is integrally connected to the food container.

A further object of the present invention is to provide a food container with a latching arrangement for holding a handle which is removable from the food container and thereafter connectable thereto to provide a handle during a cooking process.

Still another object of the present invention is to provide a food container with a zip-off top which may be utilized as a pot lid.

Yet another object of the present invention is to provide a food container with a removable label to prevent the burning of the food container label when the container is being used as a cooking utensil.

A unique function of the removable label is to provide a sanitary condition for the top of the food container.

Still a further object of the present invention is to provide an upwardly extending rim which is higher than the normal rim of a food container to permit the boiling of the contents of the food container without spilling over the edge of the can when used as a pot.

Another object of the present invention is to provide a high rim on the upper edge of the food container having protrusions or holes therein which are used to stabilize the handle when it is inserted or connected to the can, used as a pot.

Still another object of the present invention is to provide a food container having printed labels thereon which will not burn when the container is converted to a cooking utensil.

Still another object of the present invention is to provide a removable handle attachable to a food container which is coated with material to prevent the transmission of heat from the food container, when converted to a cooking utensil, to the hand of the user.

A further object of the present invention is to provide a plurality of protrusions within the can to act as a means for holding the food container cover during the cooking operation.

Another object of the present invention is to provide a plurality of extensible handles so that more than one handle may be utilized when the food container is utilized as a cooking utensil.

The objects of the present invention, above enumerated, and other objects which will become more apparent as the description proceeds are achieved by providing a food container usable as a cooking utensil comprising a can of any wellknown shape having a cover and handle integrally connected to said can and extensible therefrom to be held by the user thereof, said cover being removable from said food container and adapted to be used as a cooking utensil lid, said food container being provided with an upwardly extending ridge therearound, means disposed on said food container for supporting said lid and preventing the same from falling into said food container, and a protuberance connected to said cover to act as a means of removing said cover from said food container and as acting as a handle for said lid.

BRIEF DESCRIPTION OF THE DRAWINGS

For a better understanding of the present invention reference should be had to the accompanying drawings wherein like numerals of reference indicate similar parts throughout the respective views and wherein:

FIG. 1 is an assembly view of a preferred embodiment of the present invention,

FIG. 2 is a partial perspective view showing the handle's connection to the can.

Figure 4:
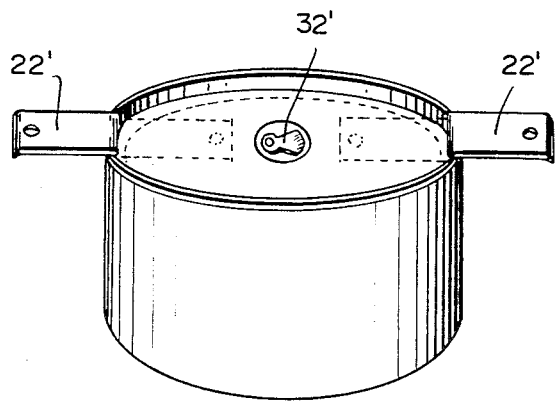
FIG. 4 is a perspective view of a can having two handles.
Figure 3:
FIG. 3 is a partial perspective view showing the rim of the can with the handle extended.

While the following disclosure relates principally to a relatively flat can, it should be particularly understood that the essence of my invention is applicable to all food container cans regardless of their height or diameter.

DESCRIPTION OF THE PREFERRED EMBODIMENTS

Referring now to FIG. 1a, a convertible food container is generally indicated by the reference numeral 10. The essence of the invention resides in the convertibility of a food preserving can into a cooking utensil and the means of holding the cooking utensil when the food is being warmed as well as the means of removing the cover of the food preserving can and converting the same into a pot lid. Further, my invention contemplates the use of a removable label to prevent dangerous fire hazards when utilizing the food container as a cooking utensil or a noncombustible label permanently affixed to the food container, such as by printing thereon.

As shown in FIG. 1a, the food container 10 generally takes the shape of a squat can having a cover 12 and a rim 14 about the upper peripheral edge 16 of the can 10. Generally, the cylindrical body portion 18 is adapted to have connected thereto a label 20 which indicates the contents of the can 10 and the brand name per se. At the upper peripheral edge 16 of the can 10 and disposed somewhat above the cover 12 on the inner portion of the rim 14, there is provided a handle 22. The handle 22 is connected to the rim 14 as by spot welding, soldering or any other appropriate means to maintain the connected end 24 on the rim 14 even in the event that the handle 22 is folded back over the rim 14 as shown in FIG. 2. The handle 22 in its unextended position is adapted to lie radially inwardly from the rim 14, as shown in FIG. 1a. Although I describe the use of a connected handle, it should be noted that the handle can be of a one-piece construction, an extension of the rim or side of the can, eliminating the connecting process. The free end 26 is bent slightly upwardly away from the cover 12 of the can 10 and may be provided with a hole 28 therein. The upwardly bent free end 26 of the handle 22 is constructed such that a user may place his or her fingernail under the upwardly bent portion 26 to easily raise or pull upwardly the handle 22, as shown by the arrow in FIGS. 1a and 1b. The hole 28 may be utilized to insert a means of aiding the movement of the upwardly rotatable handle. When the handle 22 is bent back upon itself, the handle 22 may be used to lift the food container much the same as a handle of a pot is used to carry the cooking utensil from place to place. In fact, the purpose of the handle 22 is to aid in converting the food container 10 to a cooking utensil as shown in FIG. 2.

The handle 22 may be composed of a lightweight metal such as aluminum or combination of materials or any appropriate metal which has the necessary tensile strength. The particular cross section structure is shown in FIG. 2a wherein the handle 22 takes a generally flat U-shaped structure. In this manner, the side legs 28 of the generally U-shaped structure lend to the handle 22 sufficient rigidity so that it does not collapse when being held by the user since the legs 28 act as a support over the length of the handle 22. The handle 22 may be composed of a metal with a laminate sprayed thereover to prevent the transmission of heat to the outer surface of the handle. In this manner, with the handle 22 coated, the user may be permitted to grip the handle without burning himself. Although I prefer the use of a metal handle, it should be particularly understood that other materials may be utilized, such as plastic and the like, synthetic materials which is connectable by soldering or welding to the upwardly extending rim 14.

As shown in FIG. 2, the end 24 of the handle 22 is welded to the rim 14 and the joint 30 is of sufficient strength to support the weight of the can or food container 10 when the handle is held by the user in such a manner that the can will not move downwardly or bend downwardly under the weight of the filled food container 10.

Since the handle 22 is connected radially inwardly from the rim 14, it would be difficult to utilize a conventional can opener to open the food container 10. In order to facilitate the opening of the food container 10 without the use of a conventional can opener, the cover 12 is sufficiently scored along a line 36 at the base of the rim 14 so that the cover 12 may be pulled from the food container 10. This may be accomplished by the use of pulling an upwardly extendable tab 32 which is permanently affixed, as by rivet 34 to the cover 12. The tab 32 is bendable upwardly in such a manner that it may be gripped and when pulled the cover 12 will be forced up and away from the food container 10 along the scored line 36 thereby removing the cover 12 from the food container 10. This may be seen in FIG. 2 which shows the cover 12 removed from the container 10.

The cover 12 may be utilized as a lid for the cooking utensil by merely replacing the cover 12 back on the top of the food container 10. In this respect, inwardly directed separate protrusions 38 may be provided or one complete circular rim (not shown) which may act as a support for the cover 12 where it is being used as a lid for the cooking utensil. It may be seen that when the cover 12 is pulled from the top of the food container 10, opening the same, the cover 12 may be slightly deformed because of the uneven distribution of forces on the cover 12 when the same is being pulled from the food container 10 along the scored line 36. This may somewhat distort the cover 12 (lid) which might fall into the food container 10 when it is being used as a cooking utensil. The protrusions 38 form a seat upon which the cover 12 will rest when in use as pot lid thereby preventing the lid from falling into the food container 10.

In essence, FIGS. 1 and 2 show the use of an extendable handle 22 connectable to a high rim 14 at the upper edge of a food container 10. The handle 22 converting the food container to a cooking utensil when the handle is in the extended condition as shown in FIG. 2. The cover 12 of the food container 10 is removable from the food container 10 and is reusable as a lid for the cooking utensil. It will be seen, therefore, that food contained within the food container 10 may be cooked within the can and the provision of the high rim 14 will prevent the boiling over of the contents of the food container 10 when the same is being used as a cooking utensil.

ALTERNATIVE EMBODIMENTS

Figure 11:
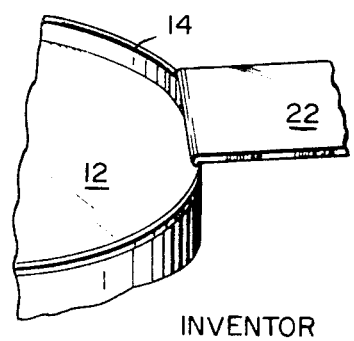
FIG. 11 is a top view of the alternative embodiment shown in FIG. 9

Alternatively, as shown in FIG. 11, the cover 12' may be removable from the food container 10 by means of a scored strip 42. The top surface of the food container is comprised of three members, the cover 12', a peripheral wide border area 44, and the scored strip 42. The peripheral wide border area 44 extends inwardly from the upwardly extending rim of the food container 10'. The inner edge 46 of the peripheral wide border area 44 is provided with a thin lip 48 on which the cover 12' is seated. In its seated position the top surface 50 of the peripheral wide border area 44 matches the top surface 52 of the cover 12' so that the entire top surface of the food container 10' would be flat and continuous. The scored strip 42 is adapted to fit over the joint between the cover 12' and the peripheral wide border area 44 in the manner shown in FIG. 12. The strip 42 may be press fitted over the joint in such a manner that it is adhered, in any manner well known to those skilled in the art, to provide a releasably permanent seal over the joint. With this configuration, the edges of the border area 44 may be of the rounded type so that no sharp edges are exposed thereby providing a safe inner edge around the border area to negate the possibility of the user cutting himself while removing food from the cooking utensil.

A tab 32' is connected to the strip 42 as by a rivet 34' such that when the rivet 34' is lifted the strip 42 may be pulled from its seated position over the joint between the border area 44 and the cover 12'. This alternative embodiment contemplates the use of the extensible handle 22' as depicted in FIGS. 1 and 2. It is contemplated that an upwardly extendable tab is connected to the cover 12' to provide a lid holder which may be used to aid in covering the cooking utensil.

It is well known to those skilled in the art that the upper edges of an ordinary can of food are provided with a rim therearound as indicated by reference numeral 14 in FIG. 1. My invention contemplates the use of a rim 14 which is slightly higher than those of the ordinary can (as previously indicated) so that the point of connection of a handle 22 to the rim 14 will not interfere with the removal of the cover 12 from the top of the food container 10, as well as other reasons heretofore described. The weld joint 30 is sufficiently removed from the scored line 36' as to not interfere with the removal of the cover 12 from the top of the food container 10 and yet is such that a solid joint is provided to maintain the weight of the can when the handle is being held in its extended position.

Alternatively, my invention contemplates the possible use of two handles 22', as shown in FIG. 4. In this latter case the structure of the handles 22' are similar to those which have been previously described except that they are shorter in length. However, it is possible to have handles of longer lengths than those in FIG. 4 if they were to lie side by side oppositely radially disposed.

Figure 5:
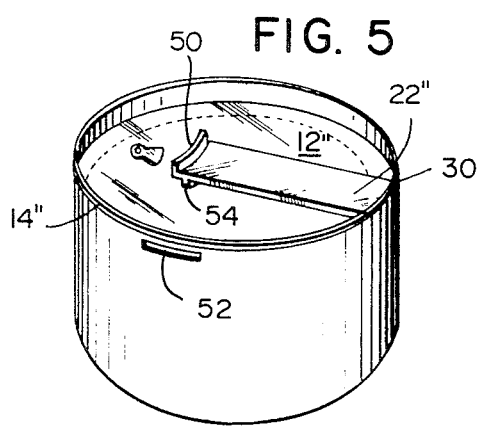
FIG. 5 is a perspective view of a can showing an alternative handle integral therewith.
Figure 10:
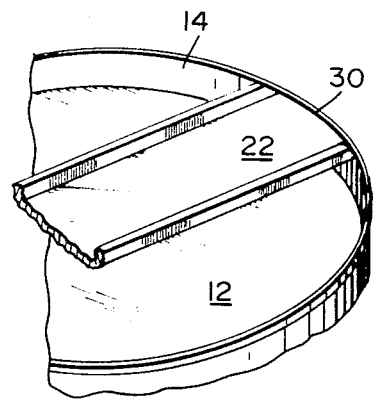
FIG. 10 is a cross-sectional view of a can showing the lid support means.
Figure 6:
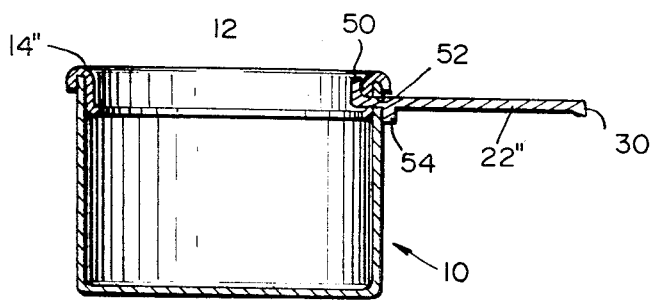
FIG. 6 is a side elevation of the can of FIG. 5.

A further alternative means of holding the food container 10 as a cooking utensil may be seen in FIGS. 5 and 6. In this case the handle 22'' is provided with an upwardly extending lip 50 which is adapted to engage a slot 52 in the rim 14'' of the food container 10. The joint 30 of the handle 22'' and the rim 14'' is such that when the handle is turned upwardly the joint 30 will break thereby providing a separate element, the free end of which contains the lip 50. In order to insure that a firm nonbendable connection is made in the slot 52, a downwardly extending protrusion 54 is provided on the free end of the handle 22''. The downwardly extending protrusion 54 is adapted to fit against the outer surface of the food container to act as a brace so that the can 10 will not rotate downwardly under its own weight when the lip 50 is inserted in the slot 52. In this manner, the handle 22' performs the function of a potholder which is a separate element used in conjunction with the food container 10 to permit the cooking of the contents of the food container 10 after the handle has been separated from the same. The cover 12'' may perform the exact same functions as previously described in the profused embodiment and the alternative embodiment. Structurally, the means of maintaining the handle in its proper position is shown in FIG. 6. The downwardly extending protrusion 54 abutting the outer surface of the food container while the lip 50 extends upwardly and into the slot 52, provides a point of connection of the free end of the handle 22'' acts as a fulcrum about which the food container 10 may attempt to rotate. The abutting downwardly extending protrusion 54 prevents such rotative movement of the food container 10.

Figure 7:
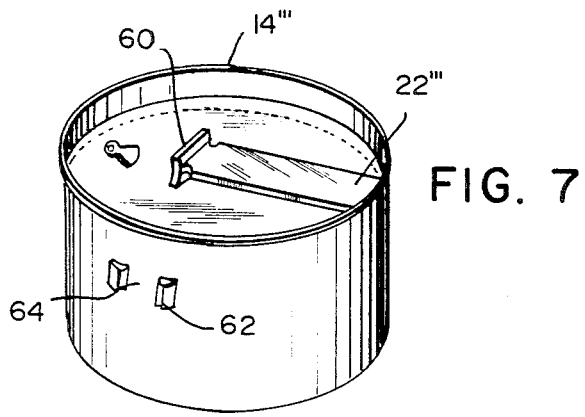
FIG. 7 is a perspective view of yet another alternative.
Figure 8:
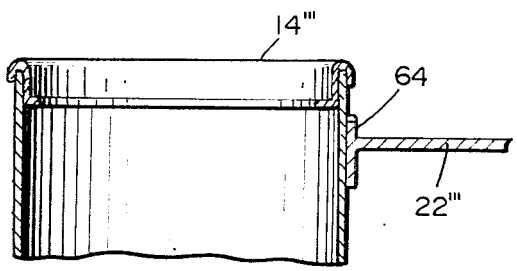
FIG. 8 shows the handle connected to the can of FIG. 7.
Figure 9:
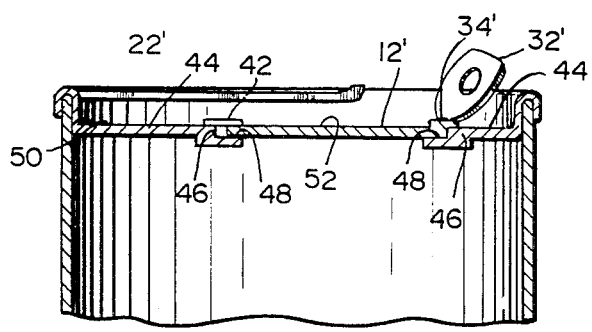
FIG. 9 is a cross-sectional view of a can showing an alternative means of lifting the cover therefrom.

A further alternative may be seen in FIGS. 7 and 8 where the handle 22''' is removable from the rim 14''' and is provided with an upwardly extending tab 60. The outer periphery of the can 10 is provided with a latching means 62 into which the tab 60 fits and acts as a handle for the cooking utensil. The latching means 62 may take the form of a guide element having a slot 64 adapted to receive the tab 60 and hold the same firmly in position. Since the tab 60 is composed of a rigid material, the weight of the food container 10 will not depress or rotate around the point of insertion in the slot 64.

Figure 12:
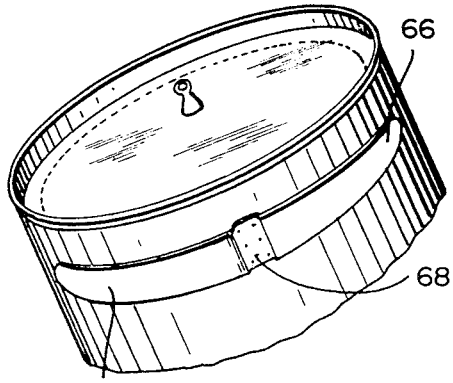
FIG. 12 is a perspective view of an alternative embodiment.
Figure 13:
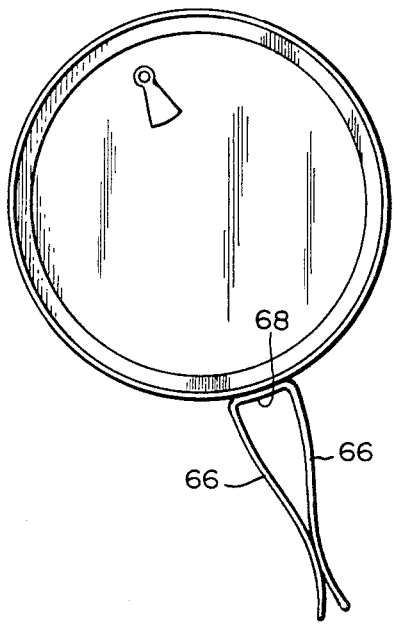
FIG. 13 is a top view of the alternative embodiment of FIG. 12.

Yet another alternative embodiment may be seen in FIGS. 12 and 13 wherein handles 66 are folded flat against the outer surface of the food container 10 and are tacked in position thereagainst. The point of tacking 68 is of such strength that the handles may be easily removable from the outer surface and thereafter folded together as shown in FIG. 13. In this way, the handle of the cooking utensil is comprised of two members which may be gripped together to provide the necessary extensible handle of the cooking utensil. Structurally, I have provided in this alternative embodiment a means of creating a food container into a cooking utensil by folding back two members which are adapted to form the handles 66 for the cooking utensil. As shown in FIG. 1, the assembly view, I have provided a removable label 70 which when connected to the outer periphery of the can provides a convenient format for the brand name and contents of the can. The purpose of such label is such that it may be easily removable from the food container 10 so that when the food container 10 is converted to the cooking utensil, flammable material is removable from the sides of the can since the label may be slid off one end of the food container. To this end, the label 70 may be tacked to the outer surface of the food container 10, at one point, and a tab 72 may be provided to loosen the label 70 from the outer surface of the food container 10 by merely pulling the tab 72. Alternatively, the label may be provided with a scored line 74 which runs the vertical length of the label such that when the tab 72 is pulled the label will be torn along the scored line permitting the simple removal of the label 70 from the food container.

As a further alternative, the label 70 may be provided with an upper end whole 76 which fits over the top of the food container thereby creating a sanitary condition on the top of the food container. In this latter instance, when the label 70 is on the food container, the top of the food container 10 (which comprises the lid 12) is kept dust free. By pulling on the tab 72, the label is torn along the scored line 76 permitting the removal of the label from the can and further permitting the extension of the handle 22 and the pulling of the cover 12 from the food container 10.

In summarizing my invention, I have described a number of alternatives to the basic idea of converting a food container 10 to a cooking utensil and the objects of my invention have been achieved by providing unique structural features which lead to a food container which is convertible to a cooking utensil having an appropriate handle means for treating the cooking utensil as an ordinary pot with a lid thereon.

While in accordance with the patent statutes a profused and alternative embodiments have been shown and described in detail, it should be particularly understood that the invention is not limited thereto or thereby.

I claim:

1. A food container adapted to be converted to a cooking utensil comprising a can having a diameter greater than its height, said can being provided with a rim around its upper edge, said rim being relatively high, handle means connected to said rim and extending radially inwardly, said handle means adapted to be moved to extend radially outwardly of said can to act as a cooking utensil handle, said can having a cover which is removable from one end of said can, said cover being provided with a tab, said cover being useable as a lid for said cooking utensil when said cover is removed, and a label slidably engageable over said can and easily removable therefrom when said food container is converted to a cooking utensil.

2. A food container adapted to be converted to a cooking utensil according to claim 1 wherein a protrusion is formed interiorly of said can to provide a seat for said lid preventing the lid from falling into said can.

3. A food container adapted to be converted to a cooking utensil according to claim 2 wherein said protrusion is comprised of a plurality of protuberances.

4. A food container adapted to be converted to a cooking utensil according to claim 3 wherein the top of said can is scored and when said tab is pulled said cover is removed from the top of said can along said scoring.

5. A food container adapted to be converted to a cooking utensil according to claim 4 wherein said tab is used as a lid holder when said cover is used as a lid.

6. A food container adapted to be converted to a cooking utensil according to claim 5 wherein said handle means is attached to the upper edge of said rim and is bendable over said rim to a radially outward position.

7. A food container adapted to be converted to a cooking utensil according to claim 6 wherein each of said handle means has a generally U-shaped cross section for structural rigidity when used as a handle for the cooking utensil.

8. A food container adapted to be converted to a cooking utensil according to claim 7 wherein each of said handle means is provided with a free end being bent slightly upwardly, a hole disposed in said slightly upwardly bent portion providing a grip for the lifting of said handle from said cover.

9. A food container adapted to be converted to a cooking utensil according to claim 8 wherein a coating is provided on said handle to prevent the heat of said cooking utensil from reaching the outer surface of said handle.

10. A food container adapted to be converted to a cooking utensil according to claim 9 wherein said label is adapted to fit around the outside of the can and is tacked in position thereon, said label being scored.

11. A food container adapted to be converted to a cooking utensil according to claim 10 wherein said label is provided with a tab on its lower end adjacent said score, said tab is pulled to provide a tearing force along said score to separate the label from the can.

12. A food container adapted to be converted to a cooking utensil according to claim 11 wherein said label is provided with a tab which is adapted to seat over the upper end of the can to maintain the cover in a sanitary condition before being converted to a cooking utensil.

13. A food container adapted to be converted to a cooking utensil according to claim 6 wherein said handle means is provided with a connecting end and a free end, said connecting end being removably connected to said rim, said free end being provided with an upwardly extending member, a slot disposed in said rim adapted to receive said upwardly extending member, said free end being provided with a downwardly extending support member adapted to engage the outer surface of said can when said upwardly extending member is matingly engaged in said slot.

14. A food container to be converted to a cooking utensil according to claim 13 wherein said handle with its free end matingly engaged in said slot is adapted to extend radially outwardly from said can, thereby providing a handle to be gripped by the user.

15. A food container adapted to be converted to a cooking utensil according to claim 6 wherein said can is provided with a latch connected to the outer surface of said can, said handle having a free end and a connecting end, said handle being removably connected to the upper edge of said rim, said free end of said handle having an upwardly extending member and a downwardly extending member, said upwardly and downwardly extending members adapted to be engaged in said latch to be held in a radially outwardly extending position.

16. A food container adapted to be converted to a cooking utensil in accordance with claim 15 wherein said upwardly extending member acts to prevent the rotative movement of said can out of the supporting position when said upwardly extending member is engaged in said latch.

17. A food container adapted to be converted to a cooking utensil in accordance with claim 6 wherein said handle has a free end and a connecting end, said connecting end being removably connected to the upper edge of said rim, said free end having an upwardly extending member, a downwardly extending member disposed in spaced relation to said upwardly extending member, a slot disposed in said rim and adapted to receive the free end of said handle, the entire surface of said upwardly extending member adapted to abut the entire surface of said rim and the outer surface of said downwardly extending member adapted to abut the outer surface of said can thereby forming a balanced lever arrangement to maintain the handle in a secure radially outwardly extending position.

18. A food container adapted to be converted to a cooking utensil in accordance with claim 1 wherein said cover of said can is comprised of a peripheral border area and a removable lid section disposed within said border area, a strip disposed over the junction of said peripheral border area and said lid adapted to seal said joint, said strip having a tab extending upwardly therefrom which is adapted to be pulled to open the cover of said food container, said strip being simultaneously removable from said peripheral border area and said lid, said peripheral border area having an inwardly directed section which is adapted to support said lid when the food container is used as a cooking utensil.

19. A food container adapted to be converted to a cooking utensil in accordance with claim 18 wherein one end of said strip is connected to said lid so that said strip may act as a lid holder when said strip is removed from said joint.

20. A food container adapted to be converted to a cooking utensil in accordance with claim 19 wherein said handle on said food container is bendable radially outwardly over the rim of said can providing a handle to be held by the user when the can is used as a cooking utensil.

21. A food container adapted to be converted to a cooking utensil comprising a can having a diameter greater than its height, said can being provided with a rim around its upper edge, said rim being relatively high, a pair of handle means connected to the outer surface of said can and adapted to be partially wrapped about the outer surface thereof, each of said handle means being tacked in position on said outer surface and adapted to be pulled together to form a handle which extends radially outwardly of said can, said can having a cover which is removable from one end thereof, said cover being provided with a tab, said cover being useable as a lid for said cooking utensil when said cover is removed and a protrusion formed interiorally of said can to provide a seat in said lid preventing the lid from falling into said can.